(12) United States Patent
Chen et al.

(10) Patent No.: US 7,903,400 B1
(45) Date of Patent: Mar. 8, 2011

(54) PORTABLE ELECTRONIC DEVICE STRUCTURE

(75) Inventors: Cheng-Hsin Chen, Taipei (TW); Te-Lun Kao, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 12/719,531

(22) Filed: Mar. 8, 2010

(30) Foreign Application Priority Data

Aug. 19, 2009 (TW) .............................. 98127951 A

(51) Int. Cl.
*G06F 1/16* (2006.01)
*H05K 5/00* (2006.01)
*H05K 7/00* (2006.01)

(52) U.S. Cl. .................................................. 361/679.27
(58) Field of Classification Search ............. 361/679.21, 361/679.27, 679.26, 679.3, 679.55; 455/575.1–575.4; 248/919–923; 312/223.2
See application file for complete search history.

(56) References Cited

U.S. PATENT DOCUMENTS

| | | | | |
|---|---|---|---|---|
| 4,960,256 A | * | 10/1990 | Chihara et al. ............ 248/286.1 |
| 5,255,214 A | * | 10/1993 | Ma ........................... 361/679.06 |
| 5,268,817 A | * | 12/1993 | Miyagawa et al. ....... 361/679.07 |
| 5,276,589 A | * | 1/1994 | Bartlett et al. ............ 361/679.06 |
| 5,337,212 A | * | 8/1994 | Bartlett et al. ............ 361/679.27 |
| 5,494,447 A | * | 2/1996 | Zaidan ............................ 439/31 |
| 5,559,670 A | * | 9/1996 | Flint et al. ................. 361/679.06 |
| 5,673,170 A | * | 9/1997 | Register ................... 361/679.06 |
| 5,900,848 A | * | 5/1999 | Haneda et al. ................. 345/1.1 |
| D416,003 S | * | 11/1999 | Schiefer et al. ............. D14/326 |
| 6,005,767 A | * | 12/1999 | Ku et al. ................... 361/679.27 |
| 6,229,693 B1 | * | 5/2001 | Karidis et al. ........... 361/679.05 |
| 6,266,236 B1 | * | 7/2001 | Ku et al. .................. 361/679.27 |
| 6,295,038 B1 | * | 9/2001 | Rebeske ........................ 345/1.1 |
| 6,464,195 B1 | * | 10/2002 | Hildebrandt .................. 248/460 |
| 6,665,175 B1 | * | 12/2003 | deBoer et al. ............ 361/679.06 |
| 6,714,403 B2 | * | 3/2004 | Furuki et al. ............. 361/679.09 |
| 6,972,947 B2 | * | 12/2005 | Duncan .................... 361/679.55 |
| 6,985,356 B2 | * | 1/2006 | Wang ....................... 361/679.06 |
| 7,065,835 B2 | * | 6/2006 | Kuramochi ..................... 16/357 |
| 7,068,497 B2 | * | 6/2006 | Chu .......................... 361/679.06 |
| 7,158,634 B2 | * | 1/2007 | Eromaki ................... 379/433.13 |
| 7,239,505 B2 | * | 7/2007 | Keely et al. .............. 361/679.09 |
| 7,277,275 B2 | * | 10/2007 | Won et al. ................ 361/679.27 |
| 7,283,355 B2 | * | 10/2007 | Han .......................... 361/679.55 |
| 7,387,572 B2 | * | 6/2008 | Hanchar ......................... 463/46 |
| 7,549,246 B2 | * | 6/2009 | Kuo .............................. 40/601 |
| 7,566,033 B2 | * | 7/2009 | Schwager et al. .......... 248/125.9 |
| 7,599,181 B2 | * | 10/2009 | Chuang et al. ........... 361/679.55 |
| 7,639,479 B2 | * | 12/2009 | Chuang et al. ........... 361/679.06 |
| 7,725,988 B2 | * | 6/2010 | Kim et al. ....................... 16/361 |
| 7,821,783 B2 | * | 10/2010 | Wang et al. .............. 361/679.27 |

(Continued)

*Primary Examiner* — Jayprakash N Gandhi
*Assistant Examiner* — Adrian S Wilson
(74) *Attorney, Agent, or Firm* — Tim Tingkang Xia; Morris, Manning & Martin, LLP

(57) ABSTRACT

A portable electronic device structure includes a first body, a connection plate, and a second body. The connection plate, pivoted to the first body, has an interworking assembly and a notch. The notch has a sliding portion and a positioning portion connected to each other. The second body has a sliding block pivoted to the interworking assembly and sliding in the sliding portion. The connection plate pivotally rotates to an open position with respect to the first body, and enables the interworking assembly to drive the second body to displace in a direction away from the first body. At this time, the sliding block slides into the positioning portion and pivotally rotates with respect to the interworking assembly, so as to drive the second body to rotate with respect to the interworking assembly.

6 Claims, 18 Drawing Sheets

U.S. PATENT DOCUMENTS

| | | | | |
|---|---|---|---|---|
| D626,547 S | * | 11/2010 | Li et al. | D14/316 |
| 2005/0078444 A1 | * | 4/2005 | Hong | 361/683 |
| 2005/0083644 A1 | * | 4/2005 | Song | 361/683 |
| 2005/0105263 A1 | * | 5/2005 | Tanaka et al. | 361/683 |
| 2005/0128695 A1 | * | 6/2005 | Han | 361/683 |
| 2007/0041151 A1 | * | 2/2007 | Park | 361/681 |
| 2007/0146975 A1 | * | 6/2007 | Chen et al. | 361/680 |
| 2008/0232054 A1 | * | 9/2008 | Chen et al. | 361/681 |
| 2009/0295975 A1 | * | 12/2009 | Takahashi et al. | 348/333.01 |

* cited by examiner

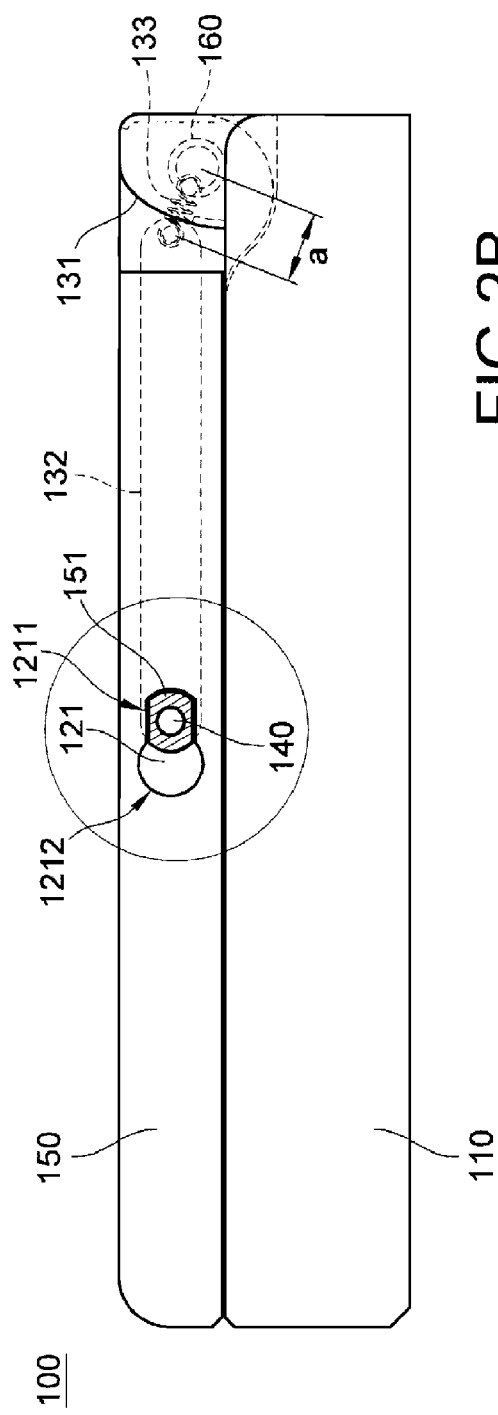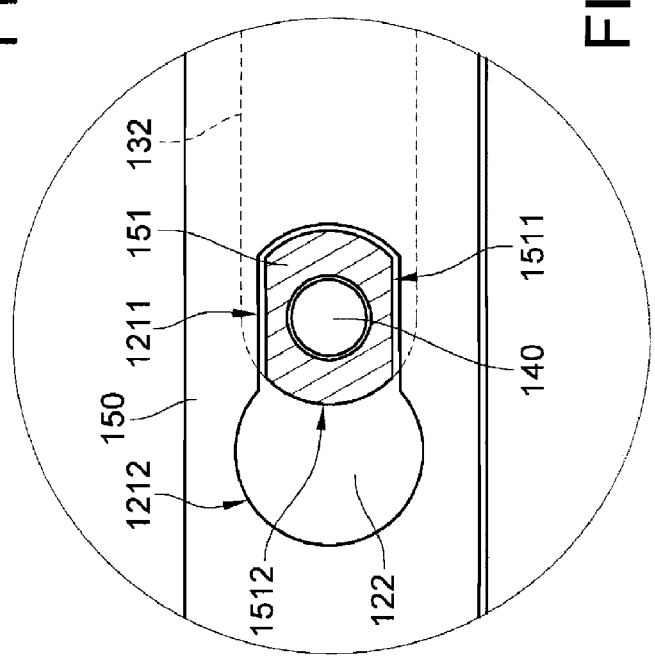

PORTABLE ELECTRONIC DEVICE STRUCTURE

CROSS-REFERENCE TO RELATED APPLICATIONS

This non-provisional application claims priority under 35 U.S.C. §119(a) on Patent Application No(s). 098127951 filed in Taiwan, R.O.C. on Aug. 19, 2009, the entire contents of which are hereby incorporated by reference.

BACKGROUND OF THE INVENTION

1. Field of Invention

The present invention relates to an electronic device, and more particularly to a portable electronic device structure.

2. Related Art

With the development of electronic technology, various portable electronic devices, such as laptop PCs, personal digital assistants (PDAs), and ultra-mobile PCs (UMPCs), which can be taken along conveniently and provide perfect functions of a computer, have become indispensable electronic products for most of users in work and daily life in the modern society.

These electronic products commonly have a touch screen and a main body. A hinge structure is used for pivotally connecting the screen and the main body as a rotating shaft therebetween, so that the screen and the main body can be connected and rotate with respect to each other via the hinge structure. The hinge structure connecting the screen and the main body of an electronic device substantially may be a uniaxial hinge structure or a biaxial hinge structure.

The uniaxial hinge structure can only make the screen cover the upside of the main body with its front side (i.e., in a close state), or make the screen open by a certain angle with respect to the main body (i.e., in an operation state). A conventional uniaxial hinge structure cannot make the screen rotate axially with respect to the main body, or make the screen turn over by 180 degrees to cover the main body with its front side facing upward. As a result, the electronic device has quite limited functions in operation, and the screen cannot rotate by any angle to be used and viewed in response to users' actual demands. Furthermore, since the screen cannot turn over with the uniaxial hinge structure and then cover the main body (in a hand-held operation state), the electronic device in use must have its screen form an inclination angle with the main body, thereby occupying a large space, and as a result, the user cannot operate the electronic device by holding the device in hand, but instead, operates the device on a table.

The electronic product with a biaxial hinge structure can not only make the screen cover the upside of the main body with its front side and open by a certain angle with respect to the main body, but also make the screen turn over by 180 degrees to cover the main body with its front side facing upward. However, since the biaxial hinge structure has no stopping mechanism between the two hinges, the two hinges may not be restricted by each other in actuation. Although the two hinges are actuated at different time points, it is still possible that, when one of the hinges is actuated, the other hinge that should not be actuated rotates along with this hinge under the influence of the force applied by a user, thus causing false operation. As a result, users find it quite inconvenient when operating an electronic device.

Therefore, it is an issue to be solved by research and development personnel in the related technical field on how to change the conventional operation mode of the existing portable electronic devices, so as to improve the operation convenience and achieve an optimum design of portable electronic devices to satisfy the market demands and adapt to the users' habits.

SUMMARY OF THE INVENTION

Accordingly, the present invention is a portable electronic device structure, so as to solve the problems in the prior art that the electronic device with a uniaxial hinge structure has limited functions, and the electronic device with a biaxial hinge structure easily results in false operation.

The portable electronic device structure of the present invention comprises a first body, a connection plate, and a second body. The connection plate is pivoted to the first body, and pivotally rotates between an open position and a close position with respect to the first body. The connection plate has a notch and an interworking assembly, and the notch has a sliding portion and a positioning portion connected to each other. The second body has a sliding block pivoted to the interworking assembly and sliding in the sliding portion. When the interworking assembly pivotally rotates to the open position with the connection plate, the interworking assembly drives the second body to displace in a direction away from the first body. At this time, the sliding block slides into the positioning portion and pivotally rotates with respect to the interworking assembly, so as to drive the second body to rotate with respect to the interworking assembly.

In the portable electronic device of the present invention, with the pivotal rotation of a rotating plate, the interworking assembly drives the first pivoting member and the second body to displace in a direction away from the first body, and a distance is formed between the second body and the first body. At this time, the second body can rotate with respect to the connection plate without being interfered by the first body, thereby achieving the purpose of performing multiple operation modes and avoiding false operation of the second body. Furthermore, the portable electronic device can always keep its appearance in consistency no matter in what operation mode, and users can easily operate and control the device.

BRIEF DESCRIPTION OF THE DRAWINGS

The present invention will become more fully understood from the detailed description given herein below for illustration only, and thus are not limitative of the present invention, and wherein:

FIG. 2B is a cross-sectional side view of the portable electronic device in a close state according to the first embodiment of the present invention;

FIG. 2C is a cross-sectional side view of the portable electronic device in a close state according to the first embodiment of the present invention;

DETAILED DESCRIPTION OF THE INVENTION

Figure 1:
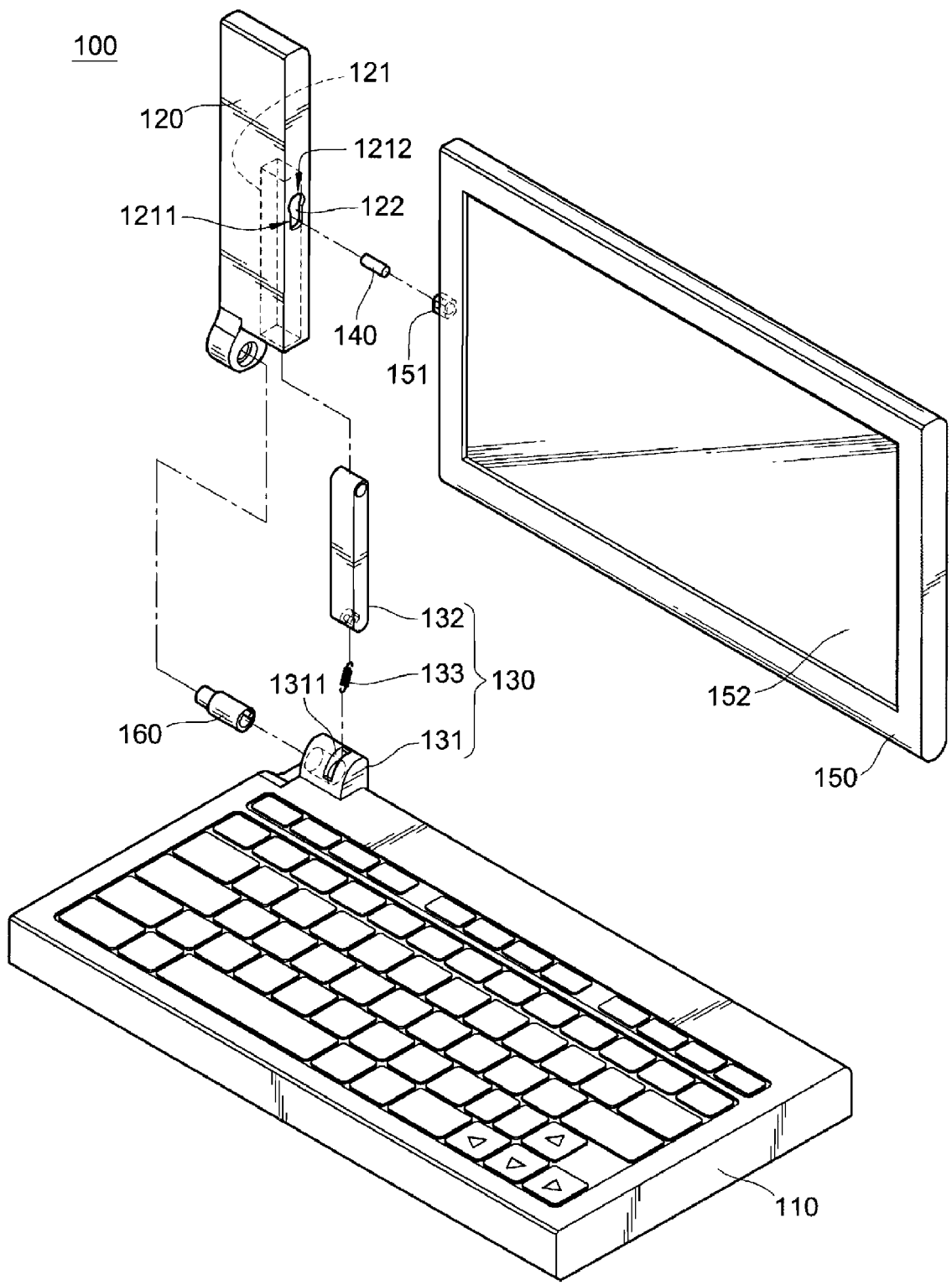
FIG. 1 is an exploded view of a first embodiment of the present invention.

FIG. 1 is a schematic exploded view of a first embodiment of the present invention. As shown in FIG. 1, the structure of a portable electronic device 100 in the first embodiment of the present invention comprises a first body 110, a connection plate 120, a second body 150, and a second pivoting member 160. The first body 110 and the second body 150 in this embodiment are, but not limited to, a main body and a touch screen, and the second body 150 has a screen 152 on one side.

The second pivoting member 160 in this embodiment is a pivot shaft disposed between the first body 110 and the connection plate 120, and respectively connected to the first body 110 and the connection plate 120. Thereby, the connection plate 120 is pivoted to an upper surface of the first body 110 in a pivotally rotatable manner, and rotates between an open position and a close position with respect to the first body 110. The connection plate 120 comprises a sliding slot 121, an interworking assembly 130, and a first pivoting member 140. The second pivoting member 160 in this embodiment is a pivot shaft.

Further referring to FIG. 1, the interworking assembly 130 in this embodiment comprises a cam 131, a drive rod 132, and a spring 133. The cam 131, disposed on the upper surface of the first body 110, is connected to the second pivoting member 160 (the second pivoting member 160 is mounted inside the cam 131), so that the second pivoting member 160 is actually connected to the cam 131 and the connection plate 120. The cam 131 of a non-equidimensional structure has a non-equal circular surface, and a slot 1311 is opened on the cam 131. The connection plate 120 has an accommodation space therein, and the drive rod 132 and the spring 133 are disposed in the connection plate 120. One end of the drive rod 132 rests on the surface of the cam 131. Two ends of the spring 133 are respectively connected to the drive rod 132 and the second pivoting member 160. The spring 133 normally pulls the drive rod 132 to keep the end of the drive rod 132 resting on the cam 131, and displace back and forth in the connection plate 120.

A notch 122 is opened on one side of the connection plate 120, and the sliding slot 121 has a sliding portion 1211 and a positioning portion 1212 connected to each other. The positioning portion 1212 is of an arc-hole structure disposed on one end of the sliding portion 1211 away from the first body 110. The first pivoting member 140 is disposed at the other end of the drive rod 132 (i.e., the other end of the drive rod 132 away from the first body 110), and passes through the notch 122 with a portion exposed outside. When the drive rod 132 displaces back and forth with respect to the connection plate 120, the first pivoting member 140 also displaces along the notch 122 with the drive rod 132.

The second body 150 has a sliding block 151 pivotally connected to the first pivoting member 140 on the drive rod 132, so as to be actuated to rotate with respect to the connection plate 120. Moreover, the sliding block 151 of the second body 150 can slide back and forth in the sliding portion 1211 of the notch 122. In specific, the sliding block 151 has two opposite sliding surfaces 1511 on its circumferential surface, and forms two opposite pivotal rotation surfaces 1512 at the same time. The sliding block 151 contacts the walls of the sliding portion 1211 with its two sliding surfaces 1511, and slides back and forth in the sliding portion 1211. In addition, the cambered surface of the pivotal rotation surface 1512 matches with the shape of the positioning portion 1212 of the notch 122, and the sliding block 151 can pivotally rotate in the positioning portion 1212. It should be noted that, the shape of the sliding block 151 does not necessarily match with the shape of the positioning portion 1212, and may be any geometric shape having a long section length and a short section length, such as an ellipse and a rectangle. Correspondingly, the positioning portion 1212 only needs to be designed with a space which can accommodate the long section length of the sliding block 151 (i.e., a distance between the two opposite pivotal rotation surfaces 1512), so that the sliding block 151 can pivotally rotate smoothly. The shape of the sliding block 151 is not limited by this embodiment.

Figure 2A:
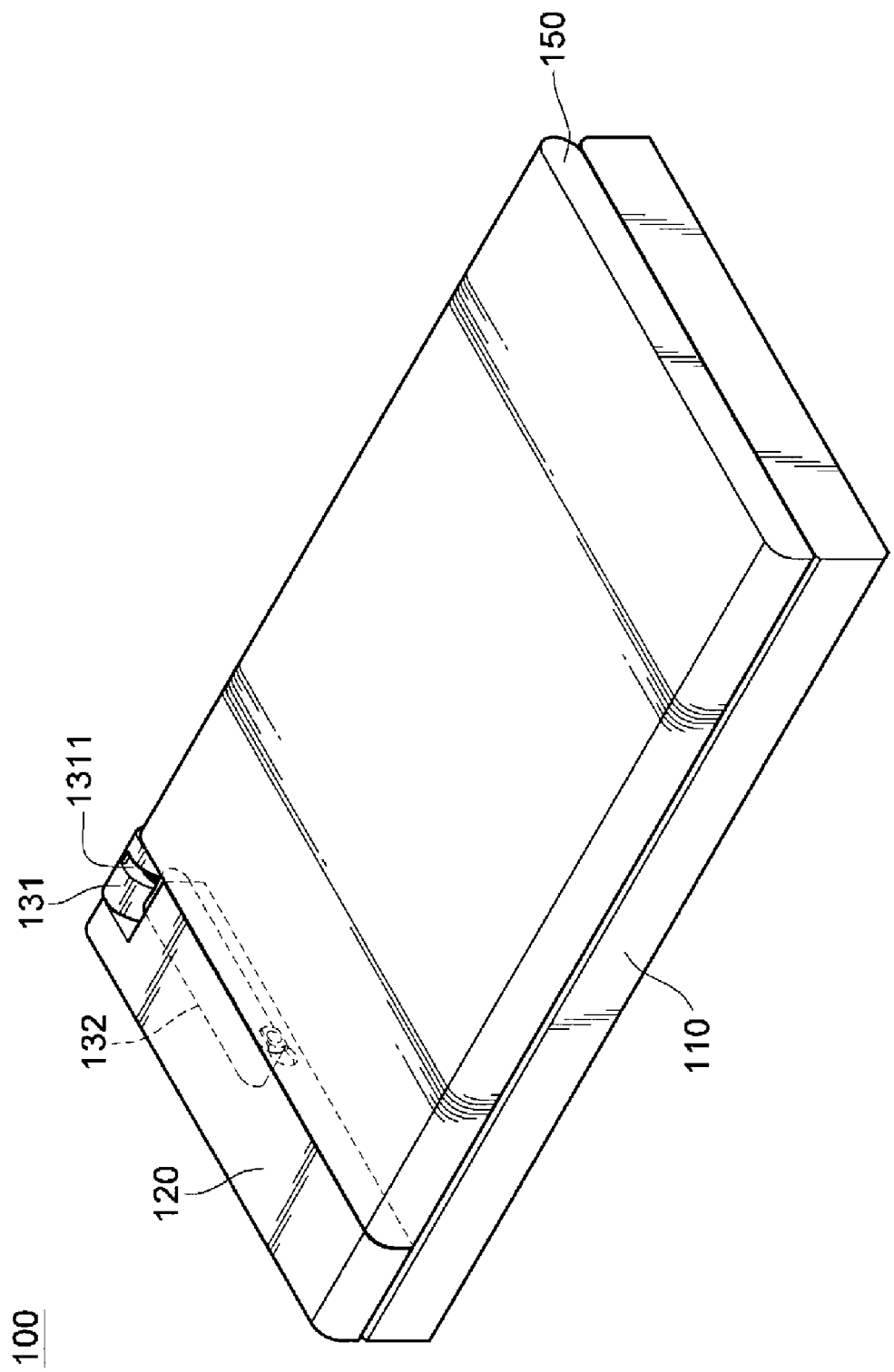
FIG. 2A is a schematic view of a portable electronic device in a close state according to the first embodiment of the present invention.

FIGS. 2A to 2C are schematic views of the actuation of the first embodiment of the present invention. Referring to FIGS. 2A to 2C and FIG. 1 at the same time, when the portable electronic device 100 is not used, the connection plate 120 covers the first body 110 (the connection plate 120 is at a close position), and the second body 150 also covers the first body 110 with its front side (i.e., the side of the screen 152 for viewing and operation). At this time, the drive rod 132 is located on a surface of the cam 131 relatively close to the center of the cam 131. Moreover, a distance a exists between the drive rod 132 and the second pivoting member 160. As no force is applied to the spring 133, the drive rod 132 may not be driven to displace along the surface of the cam 131. Meanwhile, the sliding block 151 of the second body 150 is located in the sliding portion 1211 of the notch 122, and has not slid into the positioning portion 1212 yet. Therefore, the sliding block 151, limited by the sliding portion 1211 of the notch 122, can only be actuated to displace linearly.

Figure 3A:
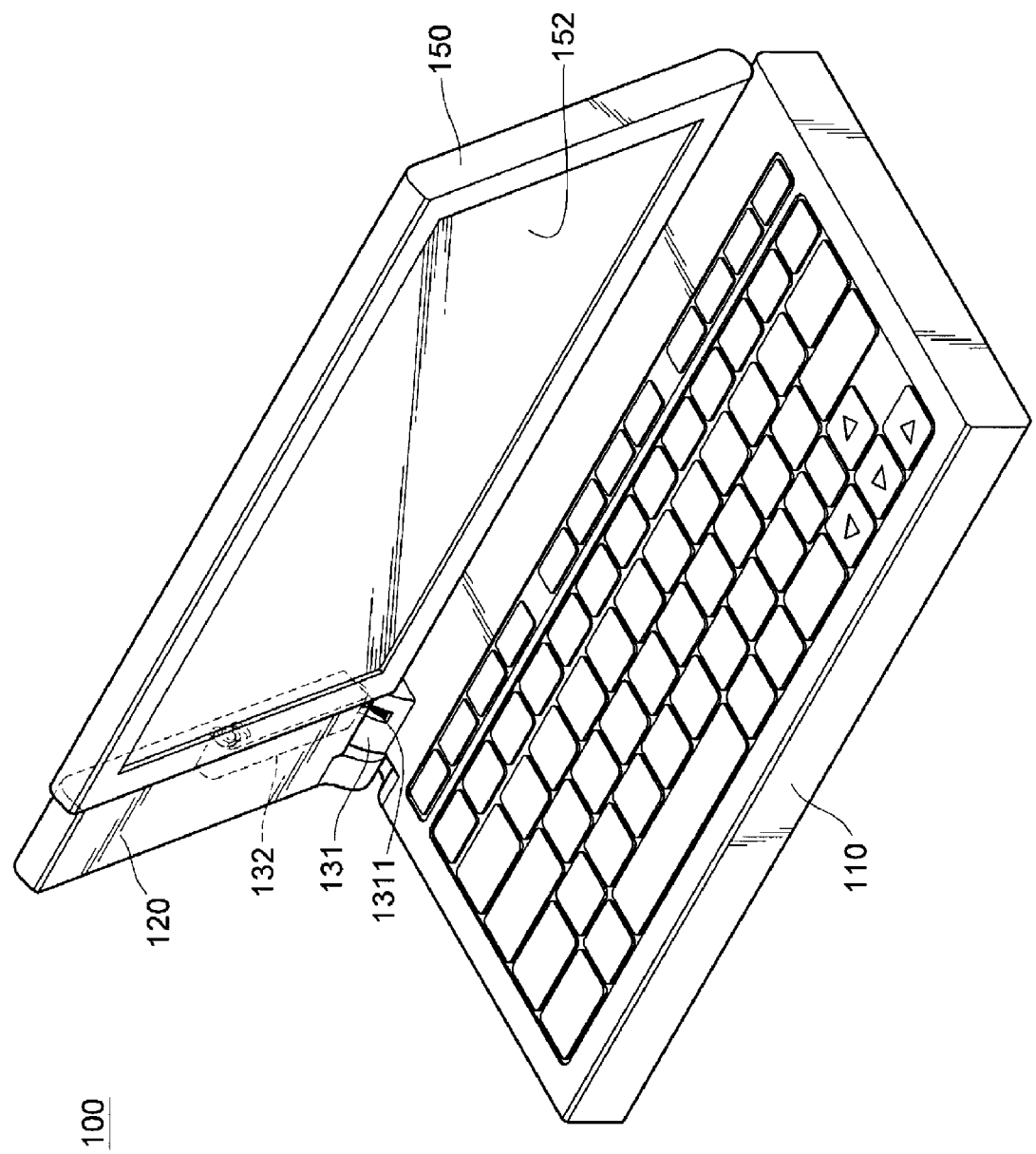
FIG. 3A is a schematic view of a second body of the portable electronic device pivotally rotating with respect to a first body according to the first embodiment of the present invention.
Figure 3B:
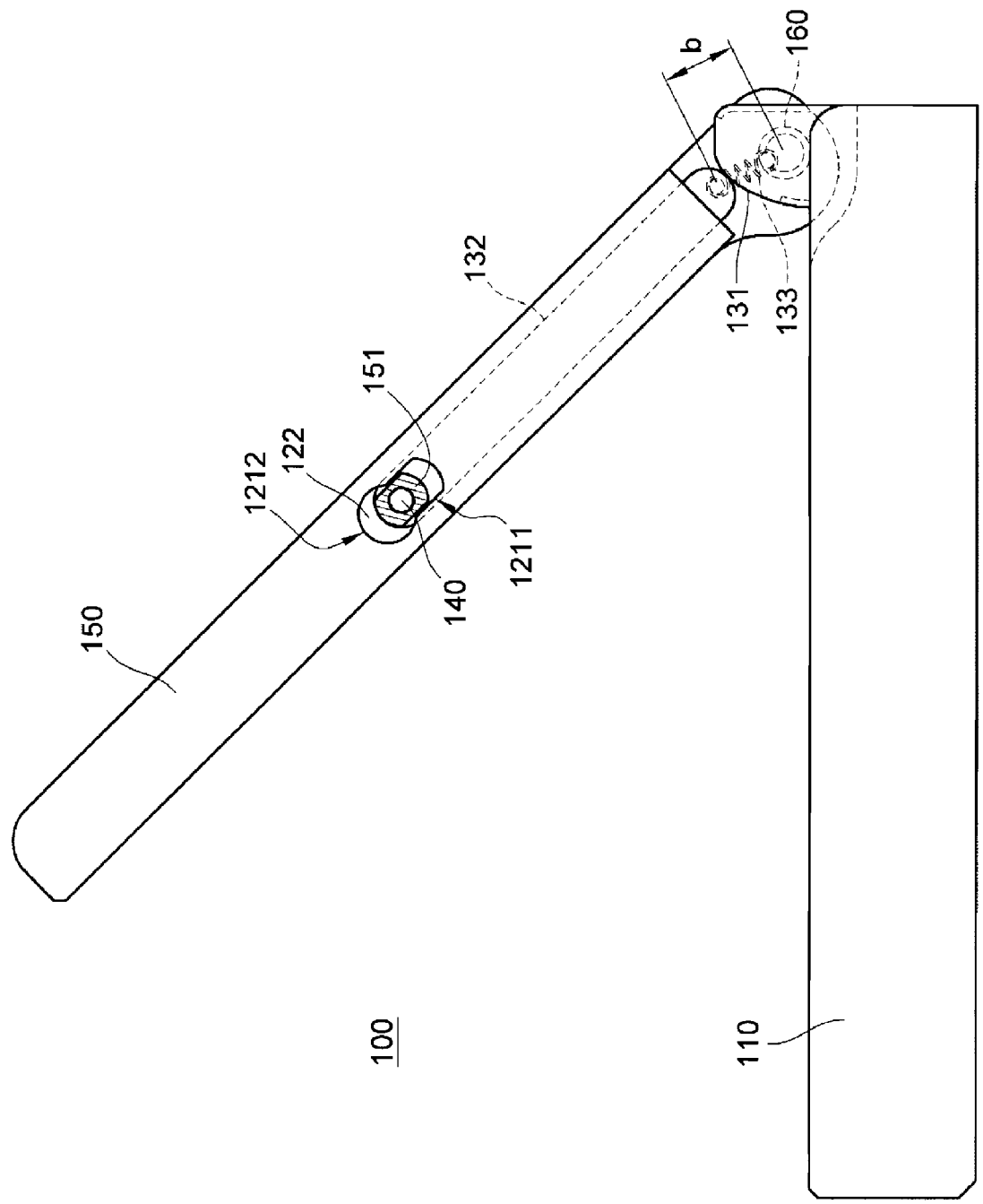
FIG. 3B is a cross-sectional side view of the second body of the portable electronic device pivotally rotating with respect to the first body according to the first embodiment of the present invention.

Referring to FIGS. 3A and 3B, in order to use the portable electronic device 100, the connection plate 120 and the second body 150 must pivotally rotate with respect to the first body 110. Thereby, the second pivoting member 160 rotates and the connection plate 120 drives the drive rod 132 to rotate, so that the drive rod 132 displaces along the cam 131 toward a surface of the cam 131 relatively far away from the center of the cam 131. The spring 133 provides a pulling force to keep one end of the drive rod 132 displacing on the surface of the cam 131. A distance b longer than the distance a in FIG. 2B exists between the drive rod 132 and the second pivoting member 160, so that the second body 150 connected to the drive rod 132 is also actuated to displace with the connection plate 120.

Figure 4A:
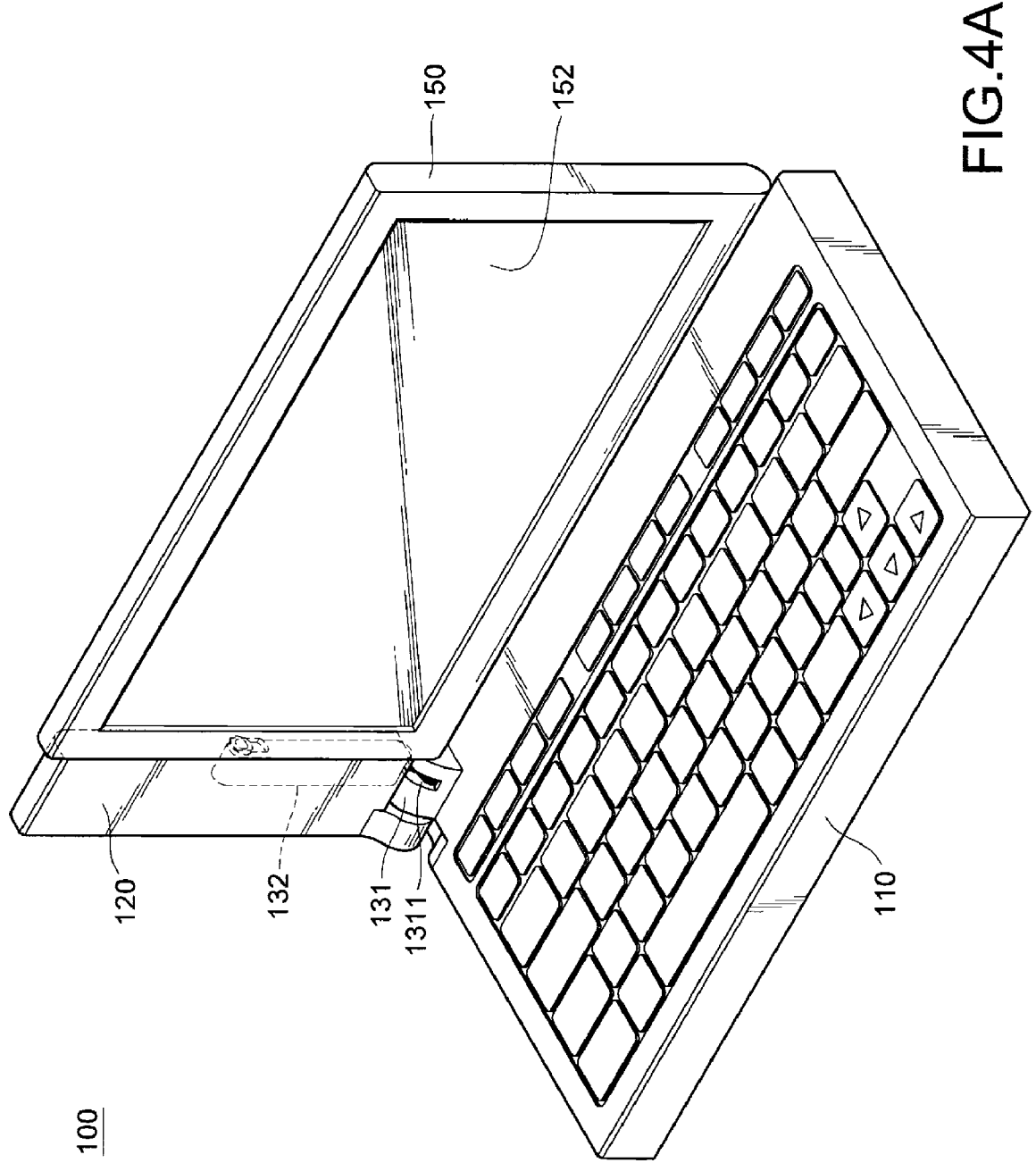
FIG. 4A is a schematic view of the portable electronic device in an open state according to the first embodiment of the present invention.
Figure 4B:
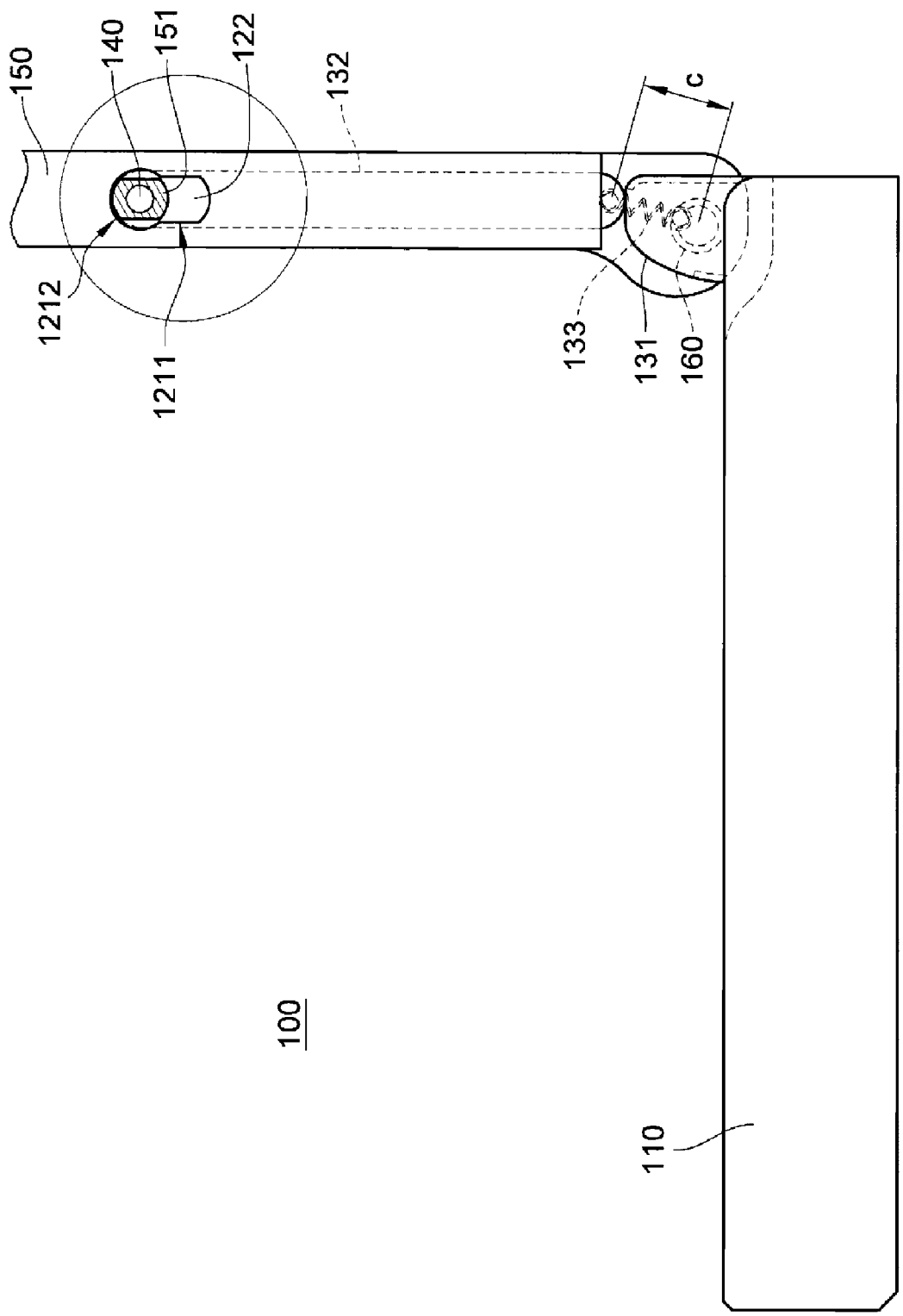
FIG. 4B is a cross-sectional side view of the portable electronic device in an open state according to the first embodiment of the present invention.
Figure 4C:
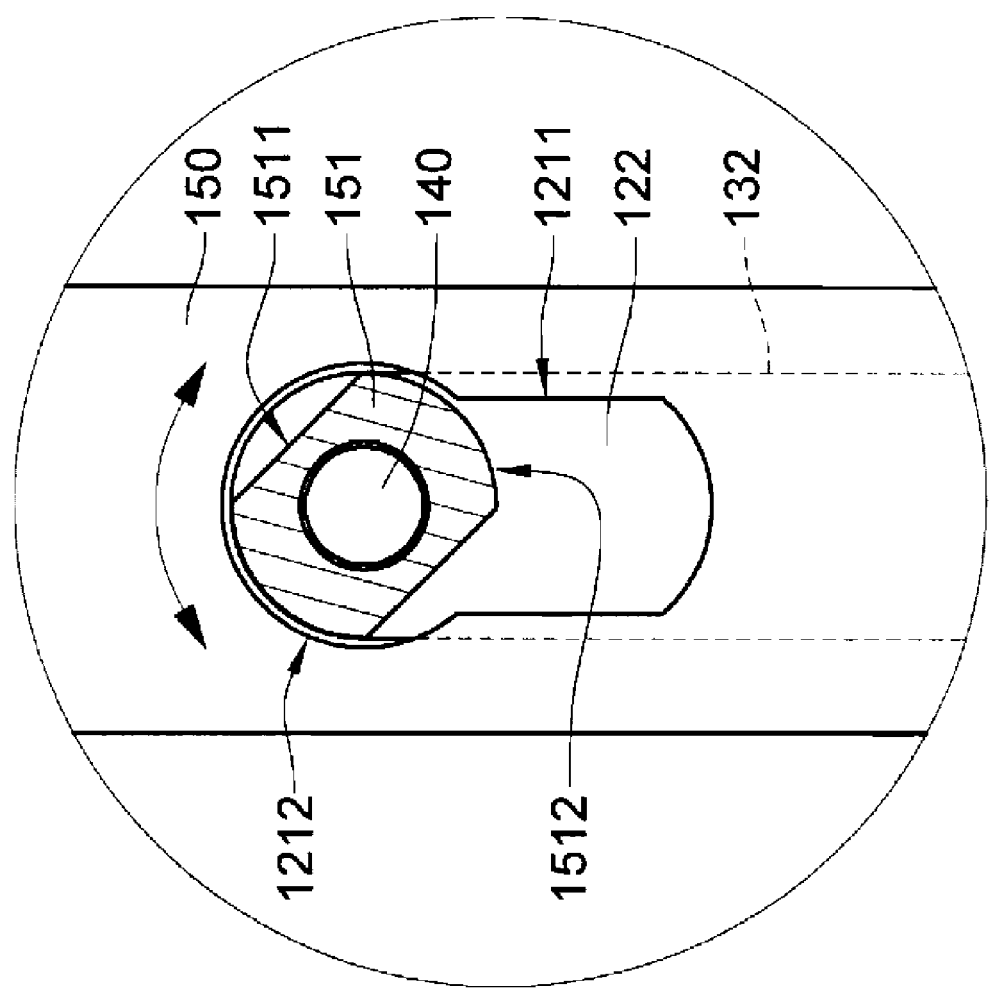
FIG. 4C is a cross-sectional side view of the portable electronic device in an open state according to the first embodiment of the present invention.

Referring to FIGS. 4A to 4C, the connection plate 120 and the second body 150 keep pivotally rotating till an angle suitable for viewing and operation is reached, for example, the connection plate 120 is at the open position, and the first body 110 and the second body 150 form an angle of 90 degrees. The drive rod 132 also continues to displace along the cam 131 toward the surface of the cam 131 relatively far away from the center of the cam 131. A distance c longer than the distance b in FIG. 3B exists between the drive rod 132 and the second pivoting member 160. As such, an angle is formed between the second body 150 and the first body 110, and the second body 150 is also driven by the drive rod 132 to displace in a direction away from the first body 110, so as to keep a distance from the first body 110. The sliding block 151 of the second body 150 slides from the sliding portion 1211 of the notch 122 into the positioning portion 1212 of the notch 122. At this time, the sliding block 151, not limited by the sliding portion 1211, may rotate with respect to the positioning portion 1212.

Figure 5:
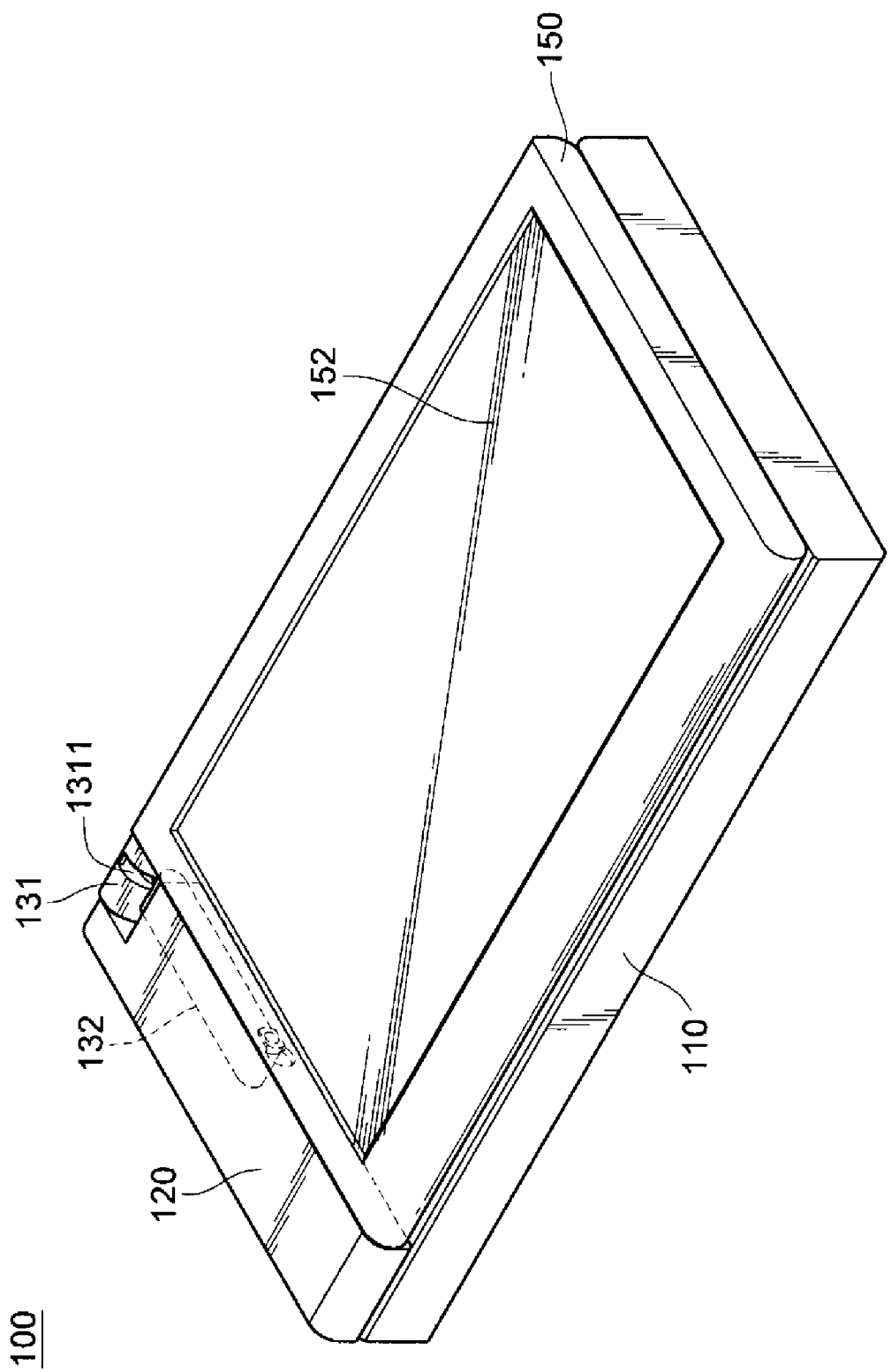
FIG. 5 is a schematic view of the second body of the portable electronic device rotating with respect to the connection plate according to the first embodiment of the present invention.

FIG. 5 is a schematic view of the portable electronic device 100 in a hand-held operation mode. When the connection plate 120 pivotally rotates to the open position, the sliding block 151 of the second body 150 slides into the positioning portion 1212 of the notch 122. The sliding block 151 pivotally rotates with respect to the positioning portion 1212, so as to drive the second body 150 connected to the first pivoting member 140 to rotate. As the second body 150 is kept a distance away from the first body 110, the second body 150 can rotate without being interfered by the first body 110.

The second body 150 after rotating by 180 degrees covers the first body 110 with its front side (i.e., the side of the screen 152 for viewing and operation) facing upward, so as to keep the appearance of the portable electronic device 100 in consistency and provide the convenience of hand-held operation of the portable electronic device 100 for users. When the second body 150 displaces from the open position to the close position, the drive rod 132 of the interworking assembly 130 is pulled by the spring 133 to displace along the cam 131, so that the first pivoting member 140 and the second body 150 displace in a direction toward the first body 110, and the second body 150 completely attaches to the first body 110.

Figure 6:
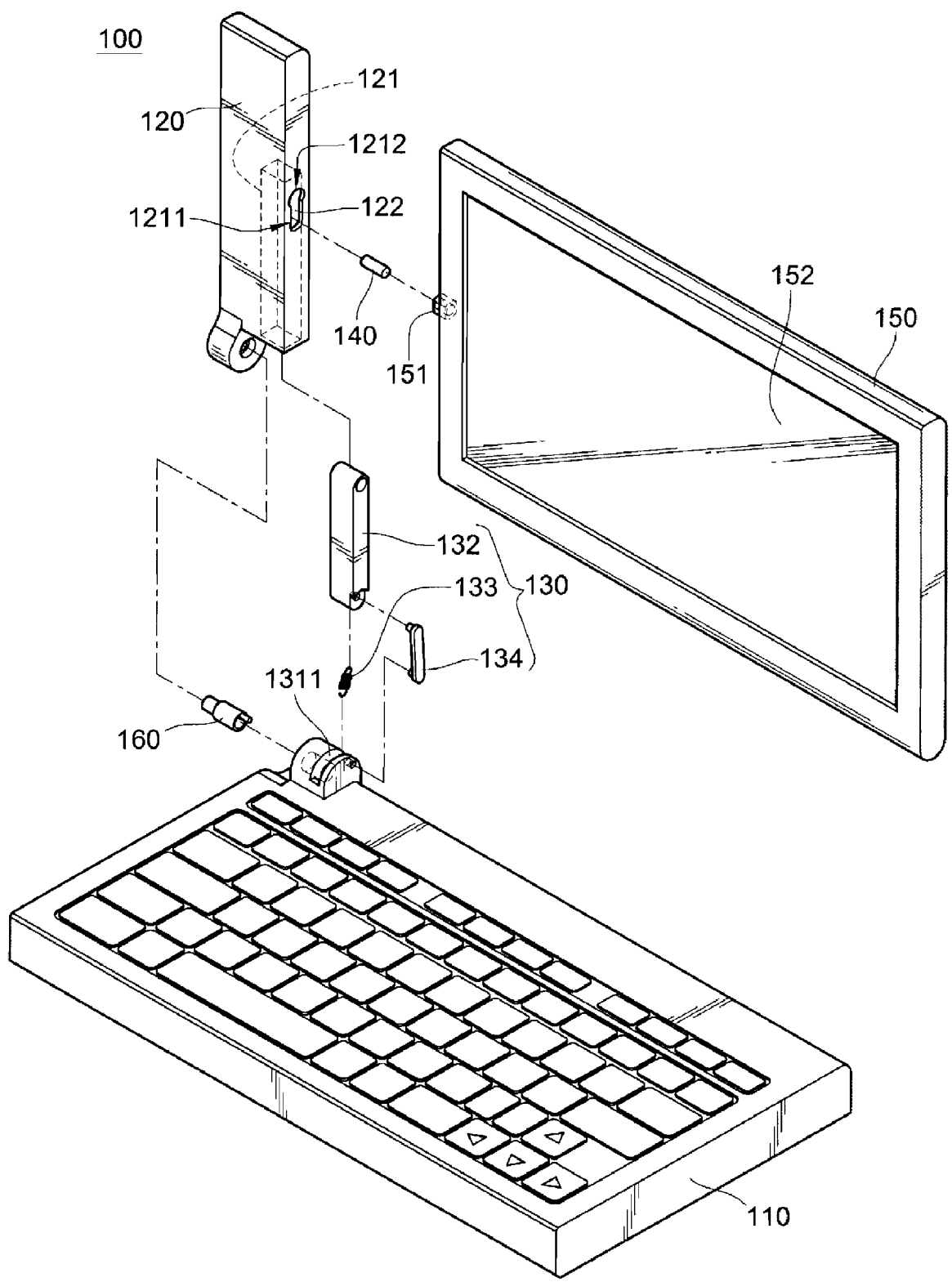
FIG. 6 is an exploded view of a second embodiment of the present invention.

FIG. 6 is a schematic exploded view of a second embodiment of the present invention. As shown in FIG. 6, the structure of the portable electronic device 100 in the second embodiment of the present invention comprises a first body 110, a connection plate 120, a second body 150, and a second pivoting member 160. The first body 110 and the second body 150 in this embodiment are, but not limited to, a main body and a touch screen, and the second body 150 has a screen 152 on one side.

The second pivoting member 160 in this embodiment is a pivot shaft disposed between the first body 110 and the connection plate 120, and respectively connected to the first body 110 and the connection plate 120. Thereby, the connection plate 120 is pivoted to an upper surface of the first body 110 in a pivotally rotatable manner, and rotates between an open position and a close position with respect to the first body 110. The connection plate 120 comprises a sliding slot 121, an interworking assembly 130, and a first pivoting member 140. The second pivoting member 160 in this embodiment is a pivot shaft.

Further referring to FIG. 6, the interworking assembly 130 in this embodiment comprises a drive rod 132, a spring 133, and a connecting rod 134. The connection plate 120 has an accommodation space therein, and the drive rod 132 and the spring 133 are disposed in the connection plate 120. Two ends of the spring 133 are respectively connected to the drive rod 132 and the second pivoting member 160, so as to keep the drive rod 132 in the connection plate 120. Two ends of the connecting rod 134 are respectively pivotally connected to the first body 110 and one end of the drive rod 132 facing the first body 110, so as to force the drive rod 132 to displace back and forth with respect to the connection plate 120.

A notch 122 is opened on one side of the connection plate 120, and the sliding slot 121 has a sliding portion 1211 and a positioning portion 1212 connected to each other. The positioning portion 1212 is of an arc-hole structure disposed on one end of the sliding portion 1211 away from the first body 110. The first pivoting member 140 is disposed at the other end of the drive rod 132 away from the first body 110, and passes through the notch 122 with a portion exposed outside. When the drive rod 132 displaces back and forth with respect to the connection plate 120, the first pivoting member 140 also displaces along the notch 122 with the drive rod 132.

The second body 150 has a sliding block 151 pivotally connected to the first pivoting member 140 on the drive rod 132, so as to be actuated to rotate with respect to the connection plate 120. Moreover, the sliding block 151 of the second body 150 can slide back and forth in the sliding portion 1211 of the notch 122. In specific, the sliding block 151 has two opposite sliding surfaces 1511 on its circumferential surface, and forms two opposite pivotal rotation surfaces 1512 at the same time. The sliding block 151 contacts the walls of the sliding portion 1211 with its two sliding surfaces 1511, and slides back and forth in the sliding portion 1211. In addition, the cambered surface of the pivotal rotation surface 1512 matches with the shape of the positioning portion 1212 of the notch 122, and the sliding block 151 can pivotally rotate in the positioning portion 1212. It should be noted that, the shape of the sliding block 151 does not necessarily match with the shape of the positioning portion 1212, and may be any geometric shape having a long section length and a short section length, such as an ellipse and a rectangle. Correspondingly, the positioning portion 1212 only needs to be designed with a space which can accommodate the long section length of the sliding block 151 (i.e., a distance between the two opposite pivotal rotation surfaces 1512), so that the sliding block 151 can pivotally rotate smoothly. The shape of the sliding block 151 is not limited by this embodiment.

Figure 7A:
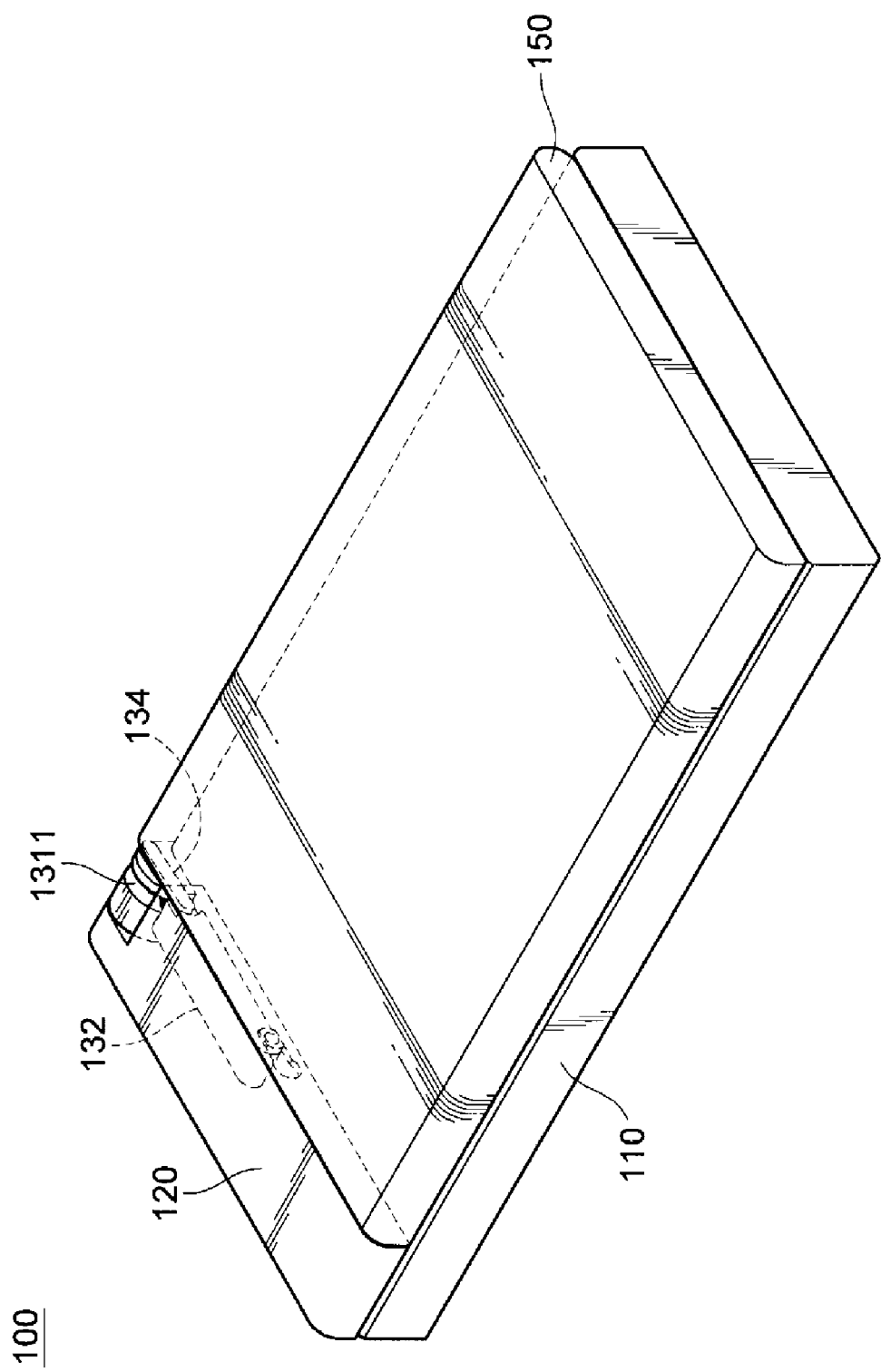
FIG. 7A is a schematic view of a portable electronic device in a close state according to the second embodiment of the present invention.
Figure 7B:
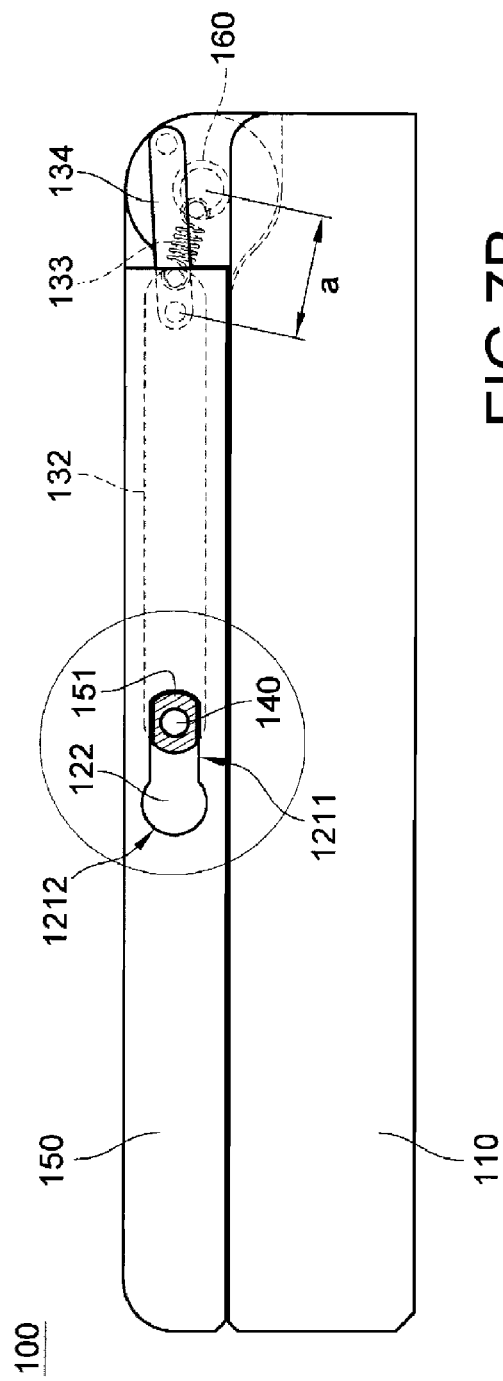
FIG. 7B is a cross-sectional side view of the portable electronic device in a close state according to the second embodiment of the present invention.
Figure 7C:
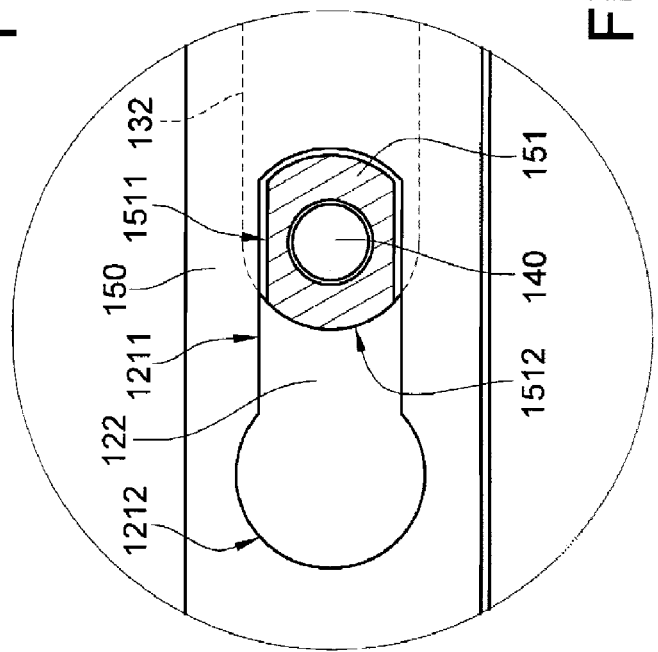
FIG. 7C is a cross-sectional side view of the portable electronic device in a close state according to the second embodiment of the present invention.

FIGS. 7A to 7C are schematic views of the actuation of the second embodiment of the present invention. Referring to FIGS. 7A to 7C and FIG. 6 at the same time, when the portable electronic device 100 is not used, the connection plate 120 covers the first body 110 (the connection plate 120 is at a close position), and the second body 150 also covers the first body 110 with its front side (i.e., the side of the screen 152 for viewing and operation). At this time, the drive rod 132 is forced by the connecting rod 134 to move to a position at a short distance a from the second pivoting member 160. The spring 133 is also in a normally compressed state. Meanwhile, the sliding block 151 of the second body 150 is located in the sliding portion 1211 of the notch 122, and has not slid into the positioning portion 1212 yet. Therefore, the sliding block 151, limited by the sliding portion 1211 of the notch 122, can only be actuated to displace linearly.

Figure 8A:
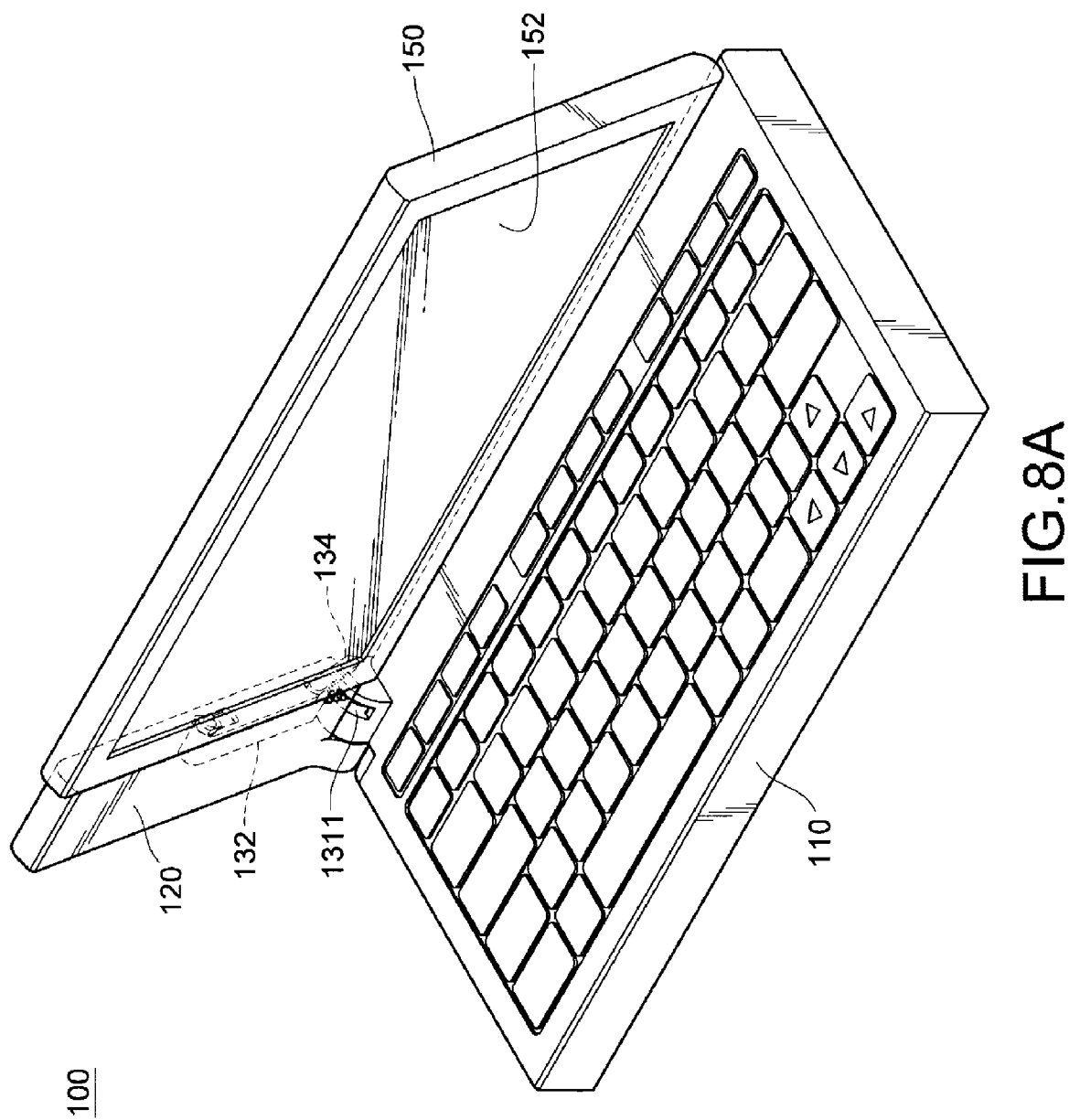
FIG. 8A is a schematic view of a second body of the portable electronic device pivotally rotating with respect to a first body according to the second embodiment of the present invention.
Figure 8B:
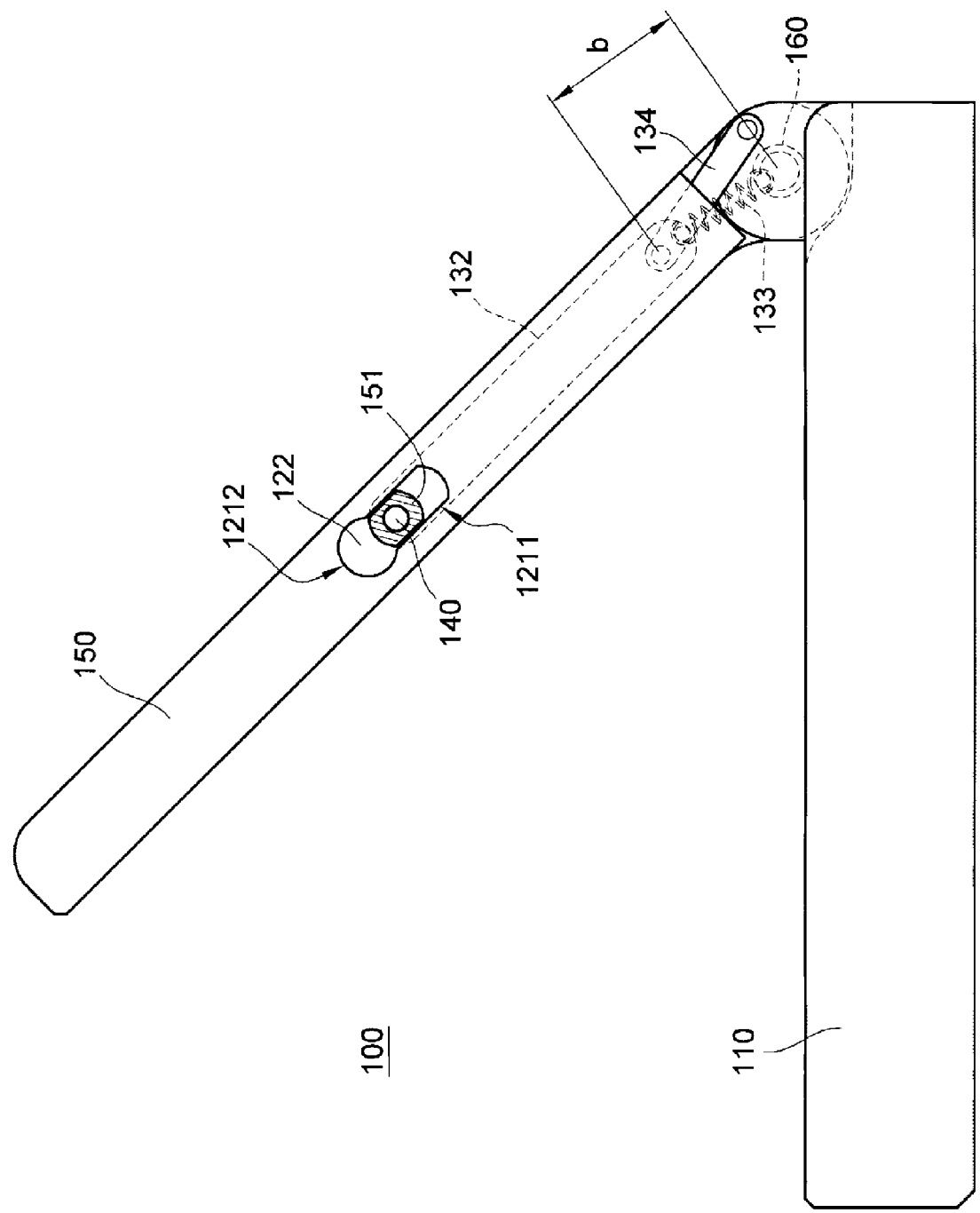
FIG. 8B is a cross-sectional side view of the second body of the portable electronic device pivotally rotating with respect to the first body according to the second embodiment of the present invention.

Referring to FIGS. 8A and 8B, in order to use the portable electronic device 100, the connection plate 120 and the second body 150 must pivotally rotate with respect to the first body 110. Thereby, the second pivoting member 160 rotates, and the connection plate 120 drives the connecting rod 134 to pivotally rotate with respect to the first body 110 and the drive rod 132. The pivotal rotation of the connecting rod 134 forces the drive rod 132 in the connection plate 120 to displace in a direction away from the second pivoting member 160. A distance b between the drive rod 132 and the second pivoting member 160 is longer than the distance a in FIG. 7B, so that the second body 150 connected to the drive rod 132 is also actuated to displace with the connection plate 120.

Figure 9A:
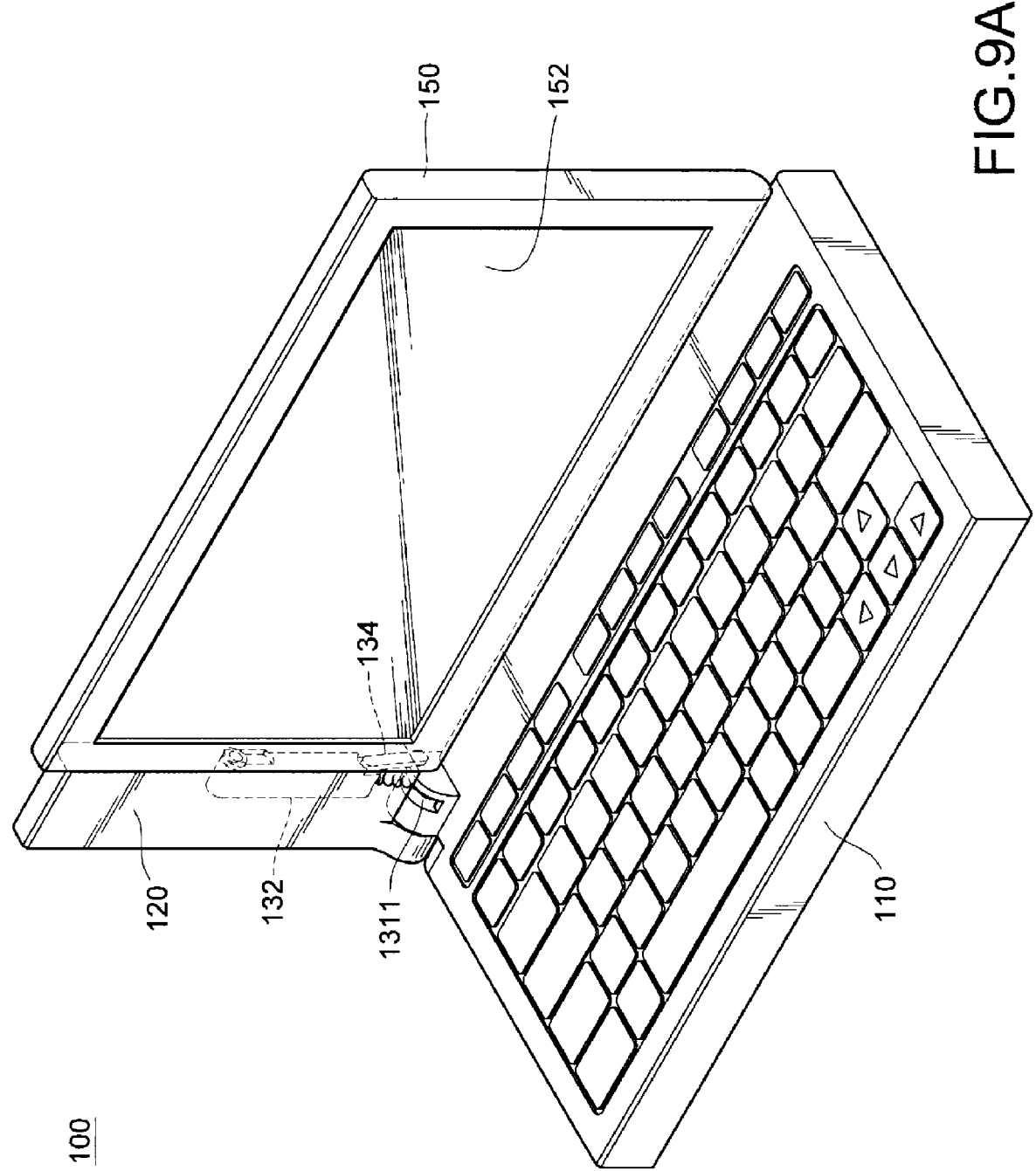
FIG. 9A is a schematic view of the portable electronic device in an open state according to the second embodiment of the present invention.
Figure 9B:
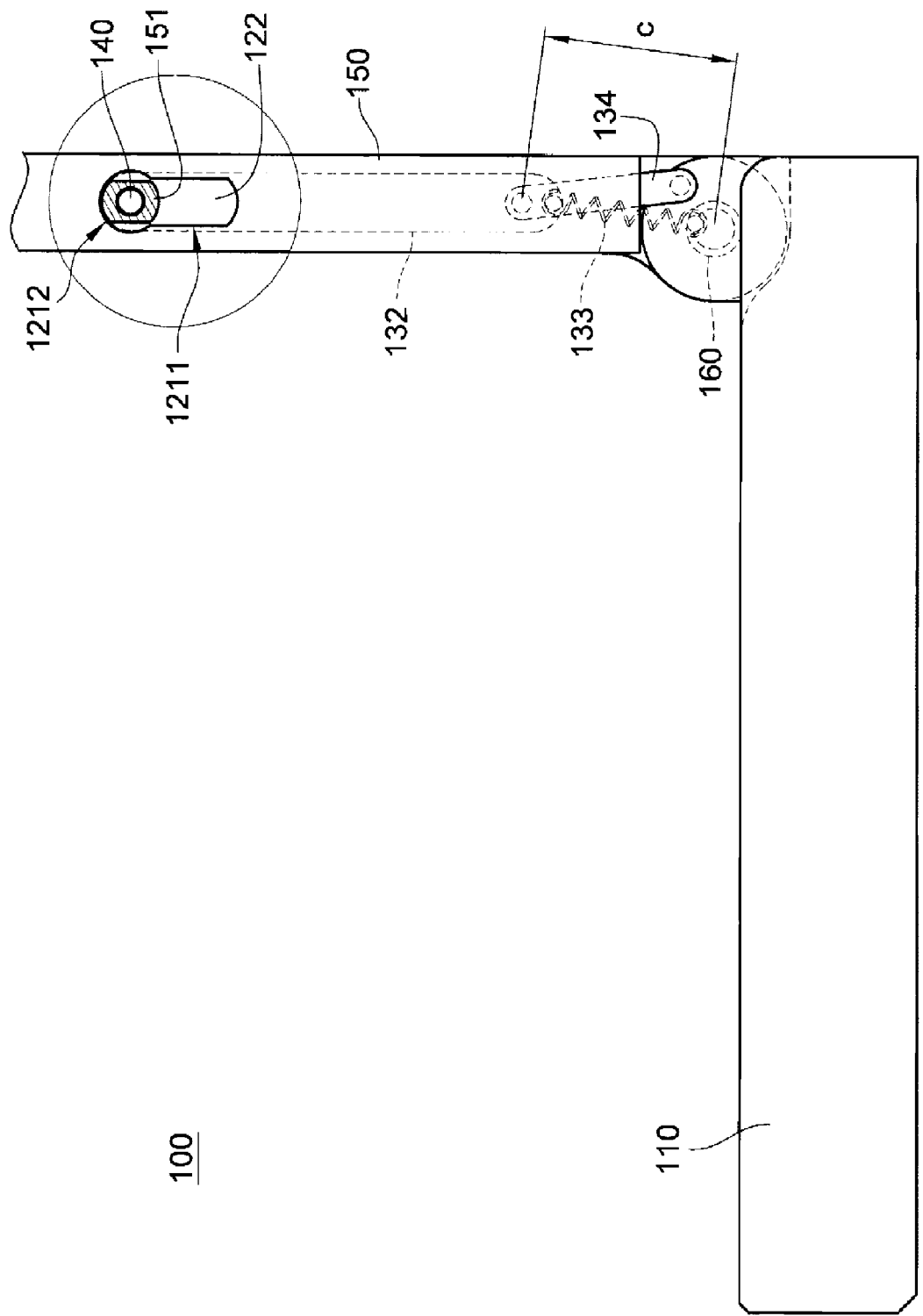
FIG. 9B is a cross-sectional side view of the portable electronic device in an open state according to the second embodiment of the present invention.
Figure 9C:
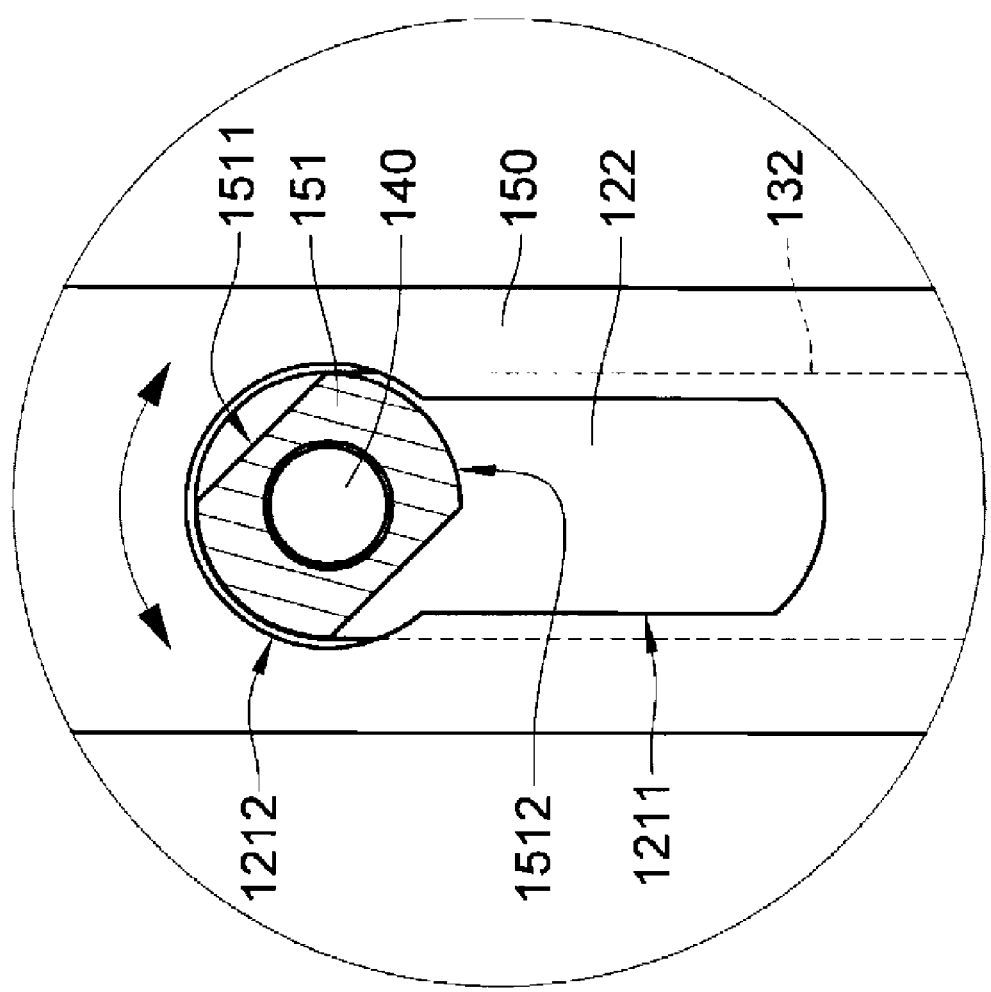
FIG. 9C is a cross-sectional side view of the portable electronic device in an open state according to the second embodiment of the present invention.

Referring to FIGS. 9A to 9C, the connection plate 120 and the second body 150 keep pivotally rotating till an angle suitable for viewing and operation is reached, for example, the connection plate 120 is at the open position, and the first body 110 and the second body 150 form an angle of 90 degrees. The connecting rod 134 continues pushing the drive rod 132 to displace in a direction away from the second pivoting member 160, and a distance c between the drive rod 132 and the second pivoting member 160 is longer than the distance b in FIG. 8B. As such, an angle is formed between the second body 150 and the first body 110, and the second body 150 is also driven by the drive rod 132 to displace, so as to keep a distance from the first body 110. The sliding block 151 of the second body 150 slides from the sliding portion 1211 of the notch 122 into the positioning portion 1212 of the notch 122. At this time, the sliding block 151, not limited by the sliding portion 1211, may rotate with respect to the positioning portion 1212.

Figure 10:
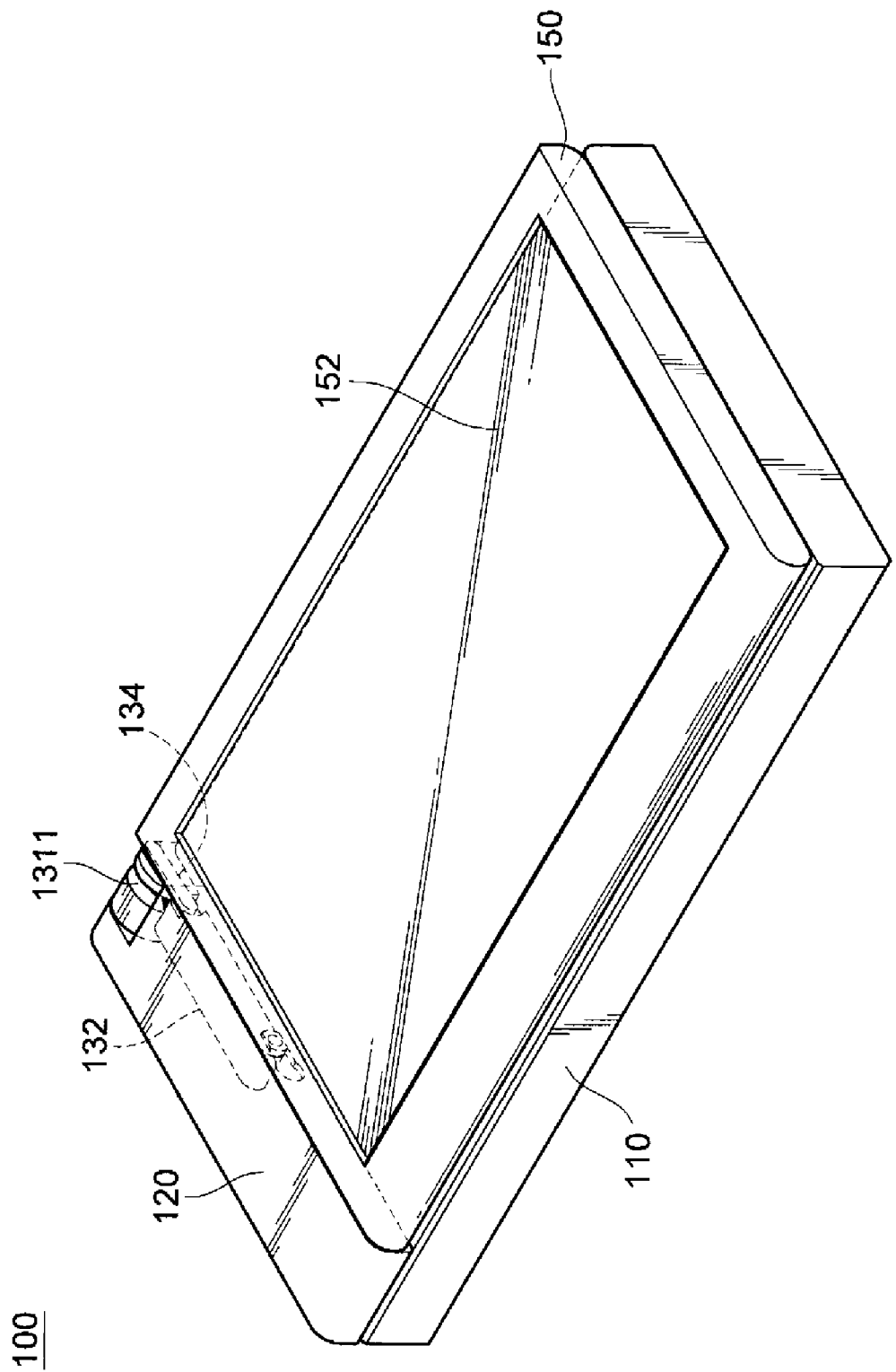
FIG. 10 is a schematic view of the second body of the portable electronic device rotating with respective to the connection plate according to the second embodiment of the present invention.

FIG. 10 is a schematic view of the portable electronic device 100 in a hand-held operation mode. When the connection plate 120 pivotally rotates to the open position, the sliding block 151 of the second body 150 slides into the positioning portion 1212 of the notch 122. The sliding block 151 pivotally rotates with respect to the positioning portion 1212, so as to drive the second body 150 connected to the first pivoting member 140 to rotate. As the second body 150 is kept a distance away from the first body 110, the second body 150 can rotate without being interfered by the first body 110.

The second body 150 after rotating by 180 degrees covers the first body 110 with its front side (i.e., the side of the screen 152 for viewing and operation) facing upward, so as to keep the appearance of the portable electronic device 100 in consistency and provide the convenience of hand-held operation of the portable electronic device 100 for users. When the second body 150 displaces from the open position to the close position, the drive rod 132 of the interworking assembly 130 is pulled by the spring 133, so that the first pivoting member 140 and the second body 150 displace in a direction toward the first body 110, and the second body 150 completely attaches to the first body 110.

The present invention has the following efficacies. The second body of the portable electronic device is simultaneously actuated by the pivotal rotation of the interworking assembly and the rotating plate, and displaces in a direction away from the first body, so as to keep a distance from the first body. Meanwhile, the limitations to the actuation and rotation of the second body are released. In this manner, the second body can rotate with respect to the connection plate smoothly without being interfered by the first body, and the portable electronic device achieves the purpose of performing multiple operation modes, thereby avoiding false operation when the second body switches the operation mode, and keeping the appearance of the portable electronic device in consistency in different operation modes.

What is claimed is:

1. A portable electronic device structure, comprising:
   a first body;
   a connection plate, pivoted to the first body, for pivotally rotating between an open position and a close position with respect to the first body, and having a notch and an interworking assembly, wherein the notch has a sliding portion and a positioning portion connected to each other; and
   a second body, having a sliding block disposed in the notch, wherein the sliding block is pivoted to the interworking assembly and slides in the sliding portion, when the interworking assembly pivotally rotates to the open position with the connection plate, the interworking assembly drives the second body to displace in a direction away from the first body, and enables the sliding block to slide into the positioning portion, and when the sliding block is located in the positioning portion, the sliding block pivotally rotates with respect to the interworking assembly, and enables the second body to rotate with respect to the interworking assembly.

2. The portable electronic device structure according to claim 1, wherein the sliding block has at least one sliding surface and at least one pivotal rotation surface, the positioning portion is of an arc-hole structure, the pivotal rotation surface matches with the arc-hole structure, the sliding block slides in the sliding portion with the sliding surface contacting the sliding portion, and the sliding block pivotally rotates along the arc-hole structure with the pivotal rotation surface.

3. The portable electronic device structure according to claim 1, wherein the connection plate has a sliding slot, and the interworking assembly comprises:
   a cam, disposed in the first body, and having a non-equidimensional structure;
   a second pivoting member, disposed in the cam, for pivotally connecting the connection plate and the cam;
   a drive rod, slidably disposed in the sliding slot, and having one end resting on a surface of the cam, wherein when the connection plate pivotally rotates toward the open position, the drive rod displaces along the surface of the cam in a direction away from the first body, and has different distances from the second pivoting member;
   a first pivoting member, connected to the other end of the drive rod; and
   a spring, respectively connected to the drive rod and the second pivoting member, for normally pulling the drive rod to keep the end of the drive rod resting on the surface of the cam.

4. The portable electronic device structure according to claim 1, wherein the interworking assembly comprises:
   a drive rod, disposed in the connection plate, for displacing back and forth with respect to the connection plate;
   a first pivoting member, connected to the other end of the drive rod away from the first body;
   a second pivoting member, disposed on the first body; and a connecting rod, having two ends respectively pivotally connected to the first body and one end of the drive rod facing the first body, wherein when the connection plate pivotally rotates toward the open position, the connection plate drives the connecting rod to pivotally rotate with respect to the first body and the drive rod, so as to force the drive rod to displace back and forth with respect to the connection plate, and enable the second body to displace in a direction away from the first body or in a direction toward the first body, and distances vary between the drive rod and the second pivoting member.

5. The portable electronic device structure according to claim 4, further comprising a spring, respectively connected to the drive rod and the second pivoting member.

6. The portable electronic device structure according to claim 1, wherein the first body is a main body, and the second body is a touch screen.

* * * * *